UNITED STATES PATENT OFFICE 2,636,016

PURIFYING SYNTHETIC RESINS

Carll F. Van Gilder, Roselle, N. J., assignor to Standard Oil Development Company, a corporation of Delaware No Drawing. Application October 11, 1949,
Serial No. 120,813

4 Claims. (Cl. 260—33.4)

This invention relates to the manufacture of synthetic resins and, more particularly, to the purification of such resins by filtration.

In the practicing of this invention, unsaturated hydrocarbon compounds are caused to react at temperatures below 0° C. in the presence of a Friedel-Crafts type catalyst dissolved in a solvent which does not form a complex with the catalyst and which is liquid at the reaction temperature to produce by polymerization an amorphous resinous reaction product of high molecular weight. In carrying out this invention, unsaturated hydrocarbon compounds from various sources may be used. Relatively pure hydrocarbons, such as diolefins and olefins, diolefins and aromatic hydrocarbons, or olefins, diolefins and aromatic hydrocarbons may be reacted together in controlled proportions to produce resins of predetermined characteristics. Indeterminate mixtures of unsaturated hydrocarbons may also be reacted in this manner. Thus, cracked distillate or special fractions of cracked distillate may be used.

The polymerization reaction is then conducted by the application of a dissolved, Friedel-Crafts type catalyst, such as aluminum chloride, aluminum bromide, titanium tetrachloride, boron trifluoride, uranium chloride and the like, dissolved in a low-freezing, inert or non-complex forming solvent, such as ethyl or methyl chloride or carbon disulfide or the like. The catalyst solution preferably contains from 0.1% to 5% of the dissolved active metal halide catalyst and is preferably used in the ratio of about 10 parts per 100 parts of the diolefin. The polymerization proceeds promptly with the development of a substantial amount of heat and the production of a solid polymer.

The resulting reaction product, consisting of a solid polymer dissolved in the inert solvent, is a viscous mass dark in color. This viscous material is then treated to terminate or kill the polymerizing reaction. Various known means may be used for this treatment, but preferably the reaction is quenched with a mixture of isopropyl alcohol and water. For convenience, a higher boiling solvent, such as naphtha, is then added and the low boiling inert solvent is evaporated by allowing the polymer solution to stand at room temperature. It is then freed of catalyst residue by washing with water. In order to free the resin of insoluble materials, the solution of polymer in naphtha is filtered through an ordinary plant filter press. The filtered solution is slurried with any desired filter aid and recirculated through the filter press until the required clarity is obtained. However, by this method of operating, the filter rates are poor, filter life is low, and clarity is borderline.

According to the present invention, these difficulties are overcome by the addition of controlled amounts of an alcohol to the naphtha solution. Suitable alcohols include methyl, ethyl, propyl, isopropyl and butyl alcohols. By this means the filter rate is improved, the filter life is increased, and the clarity much improved.

The following illustrates a typical application of the present invention:

A mixture of 45% diisobutylene and 55% butadiene was polymerized under reflux at 0° F. with liquid propane as an internal refrigerant in the presence of a solution of aluminum chloride in ethyl chloride as the catalyst. The reaction mixture was then quenched with naphtha to give a 40% solution of resin. 500 gallons of this crude resin solution in naphtha were added to a press feed tank which was equipped with stirrer and circulating pump. To this solution while agitating was added 20–50 gallons of 99% isopropyl alcohol. Meanwhile to 50–75 gallons of a filtered solution of resin in naphtha was added 5 gallons of alcohol, followed by 150# of filter aid. After stirring for a short time to ensure a smooth paste the concentrated slurry was pumped into the main batch. Further crude resin solution was added to bring the total to 750 gallons. After thorough mixing, the material was circulated through an ordinary plate and frame press (200 ft.$^2$) until the desired clarity was obtained; then it was pressed to a run down drum for storage before stripping to remove naphtha.

The following data illustrate the improvement obtained according to the present invention:

*Table I*

| Vol. Percent Alcohol [1] | Filtration [2] | | Clarity [3] | Minutes circulation to reach clarity |
|---|---|---|---|---|
| | G. P. H./ft.$^2$ | Total Gals. | | |
| 0 | 0.3–0.5 | 60–100 | 2–3 | 15–30 |
| 5 | 4–8 | 750 | 1–2 | 10–15 |
| 7.5 | 11–12 | 750 | 1–2 | 5–10 |
| 10 | 12–13 | 750 | 1–2 | 5–10 |

[1] Based on naphtha-resin solution.
[2] 700 gals. of 40% resin in naphtha plus 150# filter aid preslurried in 50 gals. of filtered solution.
[3] 0 crystal clear–6 opaque equivalent to crude solution.

The improved benefits obtained by the process of this invention cannot be attributed to the solution viscosity decrease through dilution with alcohol. This is well shown by the following data obtained in two plant runs, one with naphtha alone and the other with a mixture of naphtha and isopropyl alcohol.

*Table II*

| Vol. Percent Diluent | Filtration | | Clarity | Minutes circulation to reach clarity |
|---|---|---|---|---|
| | G. P. H./ft. | Total Gals. | | |
| 0 | 0.3-0.5 | 60-100 | 2-3 | 15-30 |
| 10 naphtha | | Did not press. | | |
| Do | 0.8 | 110 | 2 | 15 |
| 10 alcohol (99% isopropyl alcohol). | 12-13 | 750 | 1-2 | 5-10 |

The nature of the present invention having thus been described, what is claimed as new and useful and desired to be secured by Letters Patent is:

1. In a process for the preparation of a copolymer resin prepared by the copolymerization of a mixture of butadiene and diisobutylene at about 0° F. in the presence of a catalyst solution consisting of about 0.1% to 5% of a Friedel-Crafts catalyst dissolved in a low-freezing, inert, non-complex-forming solvent and wherein the crude resin so produced is filtered in naphtha solution to remove insoluble impurities, the steps which comprise polymerizing the mixture of butadiene and diisobutylene to give a reaction mixture containing the solid polymer, adding a high boiling solvent naphtha in which the polymer is soluble, to make about a 40% solution of resin diluting the solution of polymer with from 5 to 10 volume percent based on the naphtha solution of resin of a monohydric aliphatic alcohol having from 1 to 4 carbon atoms, and filtering the resultant mixture to recover a clear polymer solution.

2. In a process for the preparation of a copolymer resin prepared by the copolymerization of a mixture of butadiene and diisobutylene at 0° F. in the presence of a catalyst solution consisting of about 0.1% to 5% of aluminum chloride dissolved in a low-freezing, inert, non-complex-forming solvent, and wherein the crude resin is filtered in naphtha solution to remove insoluble impurities, the steps which comprise polymerizing the mixture of butadiene and diisobutylene to give a reaction mixture containing the solid polymer, adding high boiling naphtha in which the polymer is soluble, to make about a 40% solution of resin diluting the solution of polymer with from 5 to 10 volume percent based on the naphtha solution of resin of a monohydric aliphatic alcohol having from 1 to 4 carbon atoms, and filtering the resultant mixture to recover a clear polymer solution.

3. In a process for the preparation of a copolymer resin prepared by the copolymerization of a mixture of 55% butadiene and 45% diisobutylene at 0° F. with liquid propane as an internal refrigerant in the presence of a catalyst solution consisting of about 0.1% to 5% of aluminum chloride dissolved in ethyl chloride and wherein the crude resin is filtered in naphtha solution to remove insoluble impurities, the steps which comprise polymerizing the mixture of butadiene and diisobutylene to give a reaction mixture containing the solid polymer, adding high boiling naphtha in which the polymer is soluble, to make about a 40% solution of resin diluting the solution of polymer with from 5 to 10 volume percent based on the naphtha solution of resin of isopropyl alcohol, and filtering the resultant mixture to recover a clear polymer solution.

4. A process according to claim 3 in which the naphtha solution of the resin is diluted with about 10 volume percent of isopropyl alcohol.

CARLL F. VAN GILDER.

References Cited in the file of this patent

UNITED STATES PATENTS

| Number | Name | Date |
|---|---|---|
| 1,982,708 | Thomas | Dec. 4, 1934 |
| 2,101,558 | Nealon | Dec. 7, 1937 |
| 2,119,957 | Nealon | June 7, 1938 |
| 2,476,000 | Sparks | July 12, 1949 |
| 2,565,960 | Garber | Aug. 28, 1951 |